April 19, 1966   A. T. GASKILL ETAL   3,246,520
IMMERSIBLE THERMOCOUPLE ASSEMBLY
Filed Jan. 13, 1964
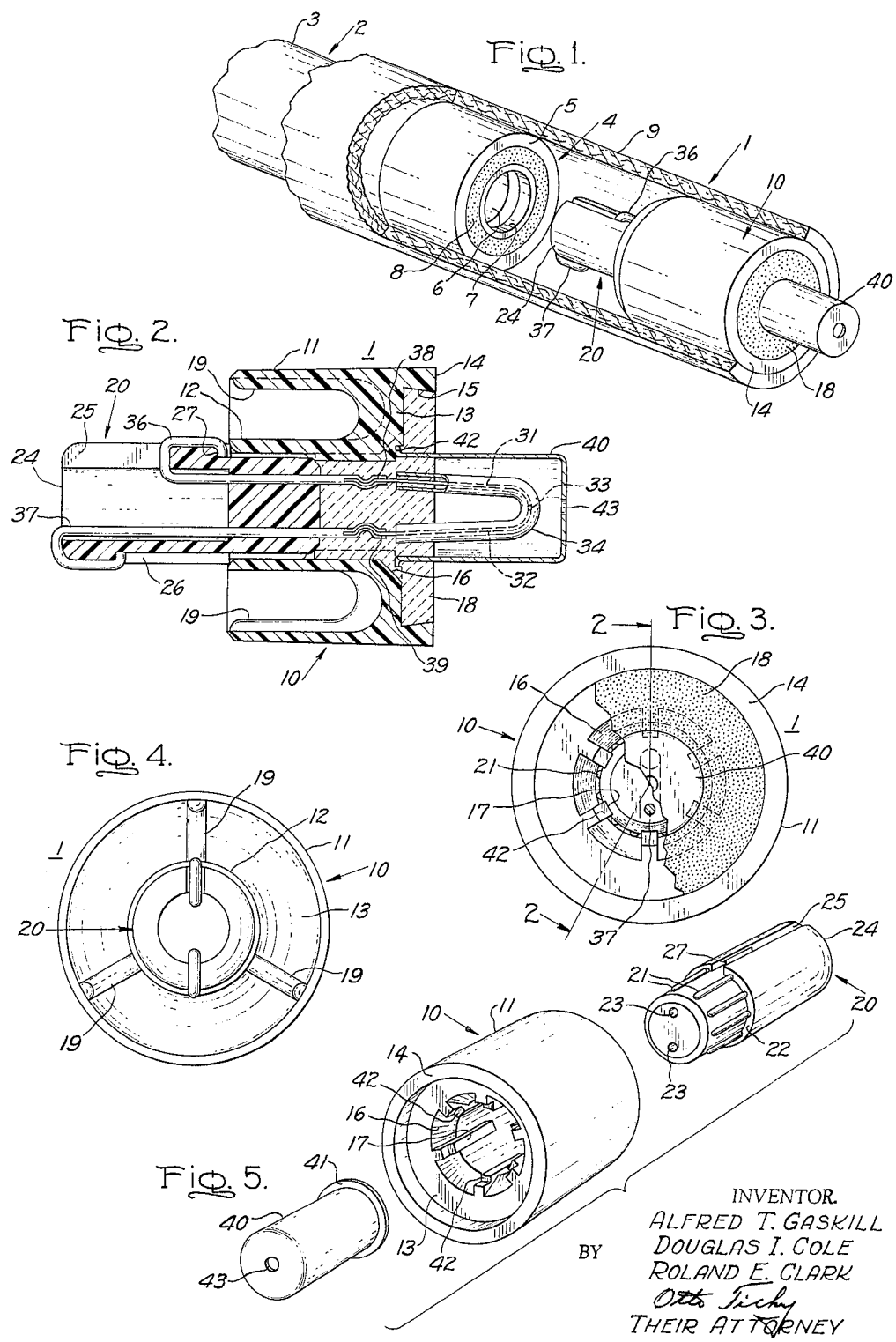
INVENTOR.
ALFRED T. GASKILL
DOUGLAS I. COLE
ROLAND E. CLARK
BY Otto Tichy
THEIR ATTORNEY United States Patent Office 3,246,520
Patented Apr. 19, 1966

3,246,520
IMMERSIBLE THERMOCOUPLE ASSEMBLY
Alfred T. Gaskill, Cleveland Heights, Douglas I. Cole, East Cleveland, and Roland E. Clark, Lyndhurst, Ohio, assignors to General Electric Company, a corporation of New York
Filed Jan. 13, 1964, Ser. No. 337,232
5 Claims. (Cl. 73—359)

The present invention relates to immersion pyrometers of the type including an expendable temperature sensing unit incorporating a thermocouple.

Temperature sensing units of this kind are now known in the art and are in extensive use in the steel industry, for example, for sensing the temperature of molten metal in a bath contained in a furnace.

An expendable thermocouple unit well known in the art includes a heat insulating sleeve and a thermocouple assembly mounted in and closing the immersion end of the sleeve. The sleeve is adapted to slip over and make a frictional fit with a manipulator or lance in the form of an elongated metal pipe and the thermocouple assembly is adapted to plug into a receptacle carried by the pipe and make electrical connection with contacts of the receptacle. By use of the manipulator the thermocouple assembly is immersed in the bath of molten metal for sensing the temperature of the bath and is withdrawn from the bath after the temperature has been measured by suitable apparatus electrically connected to the contacts of the receptacle. The thermocouple unit is removed from the manipulator after one temperature measurement has been made and is discarded to be replaced by an unused unit in making a subsequent temperature measurement.

The thermocouple assembly includes a body member, a thermocouple element mounted on the body member with its hot junction encased in a U-shaped member, such as a tube of fused quartz, and projecting out from the body member, a protective cap for the U-shaped tube and a pair of current lead wires electrically connected to and extending from the free ends of the thermocouple for electrical connection with the contacts of the receptacle in the manipulator.

The body member of the thermocouple assembly consists of electrically and thermally insulating material and, together with the sleeve, protects the cold junction between the thermocouple and the lead wires from the elevated temperatures to which the expendable thermocouple unit is subjected while the thermocouple assembly is immersed in the molten metal to maintain the accuracy of the thermocouple during temperature measurement.

The principal object of the present invention is to provide a thermocouple assembly of rugged, mechanically strong structure and of minimum cost of expendable thermocouple units of the above type.

Further objects and advantages of the invention will appear from the following detailed description of species thereof and from the drawing accompanying and forming part of this specification.

In accordance with the present invention the thermocouple assembly of the thermocouple unit includes a molded tubular body member of organic plastic material having longitudinally aligned bores, an annular shoulder having a beveled inner edge at the junction of the bores, a plurality of radial lugs on the beveled edge forming a spline arrangement and on which lugs the protective metal cap is seated, and a unitary body of solid, refractory, electrically insulating cement within the body member, filling the spaces between the lugs, mechanically sealing the bores of the body member and firmly securing the components of the thermocouple assembly together.

Referring to the drawing,
FIG. 1 is a perspective view, partly in section, with certain parts broken away showing an embodiment of the invention mounted on the end of a manipulator;

FIG. 2 is a sectional view of the thermocouple assembly taken substantially along the line 2—2 of FIG. 3 in the direction of the arrows and with the sleeve of the unit omitted;

FIG. 3 is a front elevational view of the assembly as shown in FIG. 2 with parts thereof broken away;

FIG. 4 is a back elevational view of the assembly; and

FIG. 5 is an exploded perspective view of the assembly with parts thereof removed.

Referring to FIG. 1 of the drawing the expendable thermocouple unit 1 of the present invention is shown mounted on the end of a manipulator 2 of commercial structure with the thermocouple unit not fully engaged with the manipulator to show the various parts.

The manipulator 2 constitutes no part of the present invention and is shown merely for the purpose of illustrating the element on which the thermocouple unit is removably mounted in use. The manipulator is in the form of a metal pipe 3 which may be upwards of eight feet and more in length. A socket or receptacle 4 is mounted on the end of the iron pipe 3 carrying the thermocouple unit 1 and consists of a metal sleeve 5 threaded onto the iron pipe 3 and longitudinally spaced apart annular contacts 6 and 7 supported within the sleeve 5 by a body 8 of electrically insulating material, such as neoprene. The contacts 6 and 7 are connected to a pair of insulated electrically conducting current lead wires which extend through the pipe 3 for connection with a temperature measuring system. Such systems are well known in the art and a description thereof is not necessary for complete understanding of the present invention which has to do with the expendable thermocouple unit 1. In use the end of the manipulator 2 provided with the thermocouple unit 1 is thrust into a bath of molten metal to immerse the thermocouple element of the unit in the bath. After a temperature measurement has been made the manipulator is withdrawn from the furnace containing the bath, the thermocouple unit is removed from the manipulator and replaced by an unused unit for making another temperature measurement. The time during which the thermocouple element is immersed in the molten bath is of the order of seconds, usually an immersion time of six seconds or less is sufficient for the thermocouple element to sense the temperature of the bath.

The expendable thermocouple unit 1 includes as a part thereof a sleeve 9 of heat insulating material, such as paper, or fiberboard, or the like, which slips over the end portion of the manipulator and makes a frictional fit therewith. The sleeve 9 has mounted in one end thereof the thermocouple assembly shown in detail in FIGS. 2 to 5 of the drawing which closes the end of the sleeve 9 against the entrance of molten metal into the interior of the manipulator 2. The sleeve 9, which is suitably about four feet in length, protects the parts of the manipulator, such as the receptacle 4, and parts of the thermocouple assembly from excessive heat when the end portion of the manipulator is immersed in the molten metal bath in making a temperature measurement.

Referring to FIGS. 2 to 5 of the drawing, the thermocouple assembly comprises a unitary tubular body member 10 of double wall construction consisting of phenolic plastic material molded in one piece. The body member 10 has an outer cylindrical wall 11, an inner cylindrical wall 12 and an annular wall 13 integral with the walls 11 and 12. The annular wall 13 is set back slightly from one end of the outer wall 11 and forms a transverse, flat, annular shoulder within the body member 10. The part 14 of the outer wall 11 extending forwardly beyond the wall 13 has an inner surface 15 tapering outwardly of the body member 10. The tubular body member 10 thus has longitudinally aligned bores, the foremost bore being defined by the tapered surface 15 and the rearmost bore being defined by the inner surface of the inner wall 12. The foremost bore is of larger diameter than the rearmost bore of the body member 10.

The annular wall 13 is beveled at its inner edge, as shown at 16 in FIGS. 2, 3 and 5, where it merges with the inner wall 12 of the body member 10. A series of longitudinally extending, circumferentially spaced apart lugs 17 extend radially inward from the beveled edge 16 of the annular wall 13 forming a spline structure providing a plurality of channels between the foremost and rearmost bores of the body member 10. A unitary solid body 18 of refractory electrically insulating cement fills the foremost bore, partly fills the rearmost bore and fills the channels between the bores of the body member 10 as shown in FIGS. 1, 2 and 3. Strengthening ribs 19 extend longitudinally of the outer wall 11 and beneath the wall 13 as shown in FIGS. 2 and 4.

The thermocouple assembly also includes a cylindrical plug member 20 of molded organic thermoplastic material, such as polyethylene, mounted on the body member 10. One end of the member 20 is of reduced outer diameter slightly less than the inner diameter of the inner wall 12 of the body member 10 and is provided with a series of longitudinally extending bosses 21 which frictionally engage the inner surface of the inner wall 12 of the body member 10. The bosses 21 terminate at the shoulder 22 between the end of reduced diameter of the plug 20 and the larger diameter part thereof. The shoulder 22 butts against the end of the inner wall 12 in the fully inserted position of the core 20 as shown in FIG. 2. The plug member 20 in its fully inserted position in the body member 10 terminates between the ends of the wall 12 to provide space for accommodating other parts of the thermocouple assembly described below.

The end of reduced diameter of the plug 20 is solid except for two diametrical opposite wiring passages 23 extending in a longitudinal direction through the solid end of the plug. The end portion 24 of the plug extends out from the body member 10 in the assembled unit, is hollow and has in its wall a longitudinally extending slot 25 and a longitudinally extending external groove 26. A notch 27 is provided in the shoulder 22. The slot 25, the groove 26 and the notch 27 are in a common diametrical plane with the wiring passages 23 with the notch 27 in line with the slot 25 and the groove 26 extending from the shoulder 22 and terminating short of the outer end of the portion 24.

The thermocouple element of the unit 1 consists of two wires 31 and 32 of dissimilar metals joined together to form a heat responsive or measuring junction 33. The thermocouple element extends through a U-shaped, thin-walled tube 34 of electrically insulating, heat transmitting material, such as fused quartz, which serves as a supporting sheath for the thermocouple. The ends of the U-shaped tube 34 are embedded in the body 18 of electrically insulating, refractory cement, as shown in FIG. 2, and the free ends of the thermocouple wires 31 and 32 are electrically connected to the inner ends of the compensating lead wires 36 and 37, respectively. The connections between the wires 31 and 32, 36 and 37, respectively, are made by crimping the ends of wires 31 and 32 between the split ends of the wires 36 and 37 as shown at 38 and 39 in FIG. 2. The lead wires extend from their connection with the thermocouple wires through the wiring passage provided by the inner wall 12 of the body member 10 and the wiring passages 23 of the member 20. The outer end portions of the wires 36 and 37 are exposed on the outer surface of the end portion 24 of the member 20 for engagement with the ring contacts 7 and 6, respectively, of the manipulator 2. The lead wire 36 extends through the slot 25 and terminates in the notch 27; the lead wire 37 extends through the hollow end 24 of the member 20 and terminates in the groove 26. The outer surface of member 20 is recessed beneath the exposed parts of the lead wires 36 and 37 to orient these wire parts.

A cylindrical fusible metal protective cap 40 is mounted over the U-shaped tube 34 with its open end portion embedded in the cement body 18 as shown in FIG. 2. The cap has a flared rim 41 at its open end which is seated on the lugs 17 which are notched at their inner edges as shown at 42 (FIG. 5) to accommodate the rim 41. The flared rim 41 embedded in the cement body 18 holds the cap securely on the unit 1. The cap 40 is provided with a vent 43 to permit the escape of volatile material from the interior of the cap during curing of the cement of body 18.

The solid cement body 18 is affixed to the body member 10 by its engagement with the inner surfaces of the body member 10 described above, firmly supports the U-shaped tube 34, the thermocouple wires 31 and 32, and compensating lead wires 36 and 37 and the cap 40 of the thermocouple assembly in fixed relative positions and seals the interior of the body member 10 against the entrance of molten metal of the bath to protect the receptacle 4 from excessive heat during immersion of the thermocouple assembly. The shape of the unitary cement body 18, which includes the cylindrical portion within the space defined by the inner wall 12 of the body member 10 and the outwardly flaring disc shape portion filling the space defined by the surface 15 and the annular wall 13 of the body member, is effective for holding the parts of the assembly together when the thermocouple unit 1 is pulled off the pipe 3. This is of particular importance in the event the annular contacts 6 and 7 of the manipulator tend to bend too firmly therein the exposed parts of lead wires 36 and 37 engaged therewith.

The outer wall 11 of the body member 10 tapers slightly in the direction away from the cap 40 as shown in FIG. 2 for facilitating insertion of the thermocouple assembly into the end of sleeve 9 to close the opening in the sleeve as pointed out above and as shown in FIG. 1.

The thermocouple unit may be readily assembled in the following manner. The thermocouple element 31, 32, 33 is threaded into the U-shaped tube 34 with the free ends of the wires 31 and 32 extending beyond the ends of the tube 34. The lead wires 36 and 37 are mounted on the plug member 20 in the positions shown in FIGS. 1 and 2 with their straight ends extending through and beyond the wiring passages 23 in the plug member 20. The free ends of the thermocouple wires 31 and 32 are then attached to wires 36 and 37 as described above. The U-shaped tube 34 and its protected thermocouple element is then passed through the wiring passage defined by the inner wall 12 in body member 10 and the end of plug member 20 is thrust into the end of the said wiring passage.

With these parts jig supported in proper relative positions shown in FIG. 2 and with the assembly supported with the plug member 20 lowermost, cement in liquid form is poured into the assembly in sufficient amount to constitute when dried the solid body 18. The liquid cement is of sufficient viscosity to hold the assembled parts in proper relative positions while the cap 40 is placed over the tube 34 and pressed into the liquid cement until the flared rim 41 thereof rests against the notches in lugs 18. Thereafter the cement is cured to form the solid body 18. The assembly is then thrust into the end of the sleeve 9 with which it makes a tight frictional fit. When desired, a suitable bonding adhesive such as sodium silicate is provided between the sleeve 9 and the body member 10.

The expendable thermocouple unit is then ready for use with the manipulator 2 on which it is removably mounted by sliding the sleeve 9 over the pipe 3 to insert the end 24 of the plug member 20 into the receptacle 4 and bring the exposed parts of the lead wires 36 and 37 into engagement with the contacts 7 and 6, respectively, of the receptacle.

The thermocouple unit is mechanically strong and rugged and the various parts thereof are held in fixed relative position to withstand rough handling both in shipment and in use.

In a specific embodiment the thermocouple element consisted of a wire of platinum having one end welded to one end of a wire of platinum with 10% rhodium, the lead wires were substantially larger in diameter than the thermocouple wires and the lead wire connected to the platinum wire was of an alloy of copper and 2% nickel and the lead wire connected to the thermocouple wire of platinum and rhodium was of copper to avoid the introduction of extraneous E.M.F.'s into the measuring circuit. The body 18 consisted of "Sauereisen" cement which is a high alumina cement mixed as powder in sodium silicate. The cap 40 consisted of brass having a melting point lower than steel. During immersion of the thermocouple into the molten metal bath the cap melts to expose the thermocouple element within the quartz tube 34 to the heat of the bath to sense the temperature of the bath.

It will be understood, of course, that the above embodiment is described as exemplary of the invention and that it is contemplated that changes therein may be made without departure from the invention. For example, other suitable cements may be used for body 18 and other thermocouple elements known in the art may be used in place of the platinum, platinum-rhodium thermocouple described above. The tubular body member 10 may be made as a solid wall body, that is, the inner wall 12 and the outer wall 11 may be made as a single wall having an inner surface corresponding to the inner surface of inner wall 12 and an outer surface corresponding to the outer surface of outer wall 11. While such a solid wall structure eliminates the annular air space between the inner and outer walls such a space is not necessary for effective insulation of the cold junction between the thermocouple element and the lead wires of the expendable thermocouple unit shown and described because of the effectiveness for this purpose of the paper sleeve 9 overlapping the body member 10 and the organic plastic material of the member 10.

What is claimed as new and desired to be secured by Letters Patent of the United States is:

1. In an expendable immersion thermocouple unit, a thermocouple assembly comprising a molded organic plastic tubular body member having longitudinally aligned bores, the foremost of said bores tapering in an outward direction and being of larger diameter than the rearmost of said bores and an annular transverse shoulder at the junction of said bores, the inner edge of said annular shoulder being beveled and a plurality of radial lugs on the said beveled edge forming a spline structure providing communicating channels between said bores, the inner edges of said lugs being notched, a protective fusible metal cap projecting forwardly of said body member and having a flared rim seated on the notched edges of said lugs, a U-shaped heat-transmitting tube mounted in said cap with its curved portion foremost for exposure on melting of said cap, thermocouple wires joined together and forming a heat-sensing junction within the portion of said tube exposed on melting of said cap, one end of each of said thermocouple wires being connected within said body member to a separate one of a pair of spaced apart current lead wires, said lead wires having portions thereof exposed at the rear of said body member for connection with contacts of an electrical measuring apparatus, and a solid, unitary body of electrically and heat-insulating refractory cement filling the channels between the said lugs and mechanically sealing said body member, the flared rim of said cap, the ends of said U-shaped tube and the junctions between said lead wires and said thermocouple wires being embedded in said cement body.

2. In an expendable immersion thermocouple unit, a thermocouple assembly according to claim 1 wherein the solid, unitary cement body fills the foremost bore and extends into the rearmost bore of the body member to seal the body member against the entrance of molten metal from a bath of such metal.

3. In an expendable immersion thermocouple unit, a thermocouple assembly according to claim 1 comprising also an organic plastic molded plug extending into and frictionally engaging the wall of said rearmost bore, extending from the rear of said body member and supporting said lead wires in spaced apart relation.

4. In an expendable immersion thermocouple unit, a thermocouple assembly according to claim 1 wherein the tubular body member is of double wall structure around the rearmost bore.

5. In an expendable immersion thermocouple unit, a thermocouple assembly comprising a tubular body member of electrically insulating material having longitudinally aligned bores, the foremost of said bores being larger in diameter than the rearmost of said bores and a plurality of radial lugs forming a spline structure providing communicating channels between said bores, the inner edges of said lugs being notched, a protective fusible metal cap projecting forwardly of said body member and having a flared rim seated on the notched edges of said lugs, a U-shaped heat-transmitting tube mounted in said cap with its curved portion foremost for exposure on melting of said cap, thermocouple wires joined together and forming a heat-sensing junction within the portion of said tube exposed on melting of said cap, one end of each of said thermocouple wires being connected within said body member to a separate one of a pair of spaced apart current lead wires, said lead wires having portions thereof exposed at the rear of said body member for connection with contacts of an electrical measuring apparatus, and a solid, unitary body of electrically and heat-insulating refractory cement filling the channels between the said lugs, the foremost bore and extending into the rearmost bore of said tubular body member, the flared rim of said cap, the ends of said U-shaped tube and the junctions between said lead wires and said thermocouple wires being embedded in said cement body.

References Cited by the Examiner

UNITED STATES PATENTS

| 2,999,121 | 9/1961 | Mead | 73—359 X |
| 3,169,401 | 2/1965 | Newman | 73—359 |

FOREIGN PATENTS

| 921,026 | 3/1963 | Great Britain. |

LOUIS R. PRINCE, *Primary Examiner.*